(12) United States Patent
Dannoux et al.

(10) Patent No.: US 11,294,133 B2
(45) Date of Patent: Apr. 5, 2022

(54) FIBER OPTIC NETWORKS USING MULTIPORTS AND CABLE ASSEMBLIES WITH CABLE-TO-CONNECTOR ORIENTATION

(71) Applicant: Corning Research & Development Corporation, Corning, NY (US)

(72) Inventors: Thierry Luc Alain Dannoux, Avon (FR); Robert Bruce Elkins, II, Hickory, NC (US); Joel Christopher Rosson, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/937,927

(22) Filed: Jul. 24, 2020

(65) Prior Publication Data

US 2021/0033811 A1 Feb. 4, 2021

Related U.S. Application Data

(60) Provisional application No. 62/880,844, filed on Jul. 31, 2019.

(51) Int. Cl.
*G02B 6/00* (2006.01)
*G02B 6/44* (2006.01)
*G02B 6/38* (2006.01)

(52) U.S. Cl.
CPC ......... *G02B 6/4452* (2013.01); *G02B 6/3831* (2013.01); *G02B 6/3897* (2013.01)

(58) Field of Classification Search
CPC .. G02B 6/4452; G02B 6/3831; G02B 6/3897; G02B 6/4429; G02B 6/4403; G02B 6/00
See application file for complete search history.

(56) References Cited

U.S. PATENT DOCUMENTS 3,074,107 A 1/1963 Kiyoshi et al.
3,532,783 A 10/1970 Pusey et al.
(Continued)

FOREIGN PATENT DOCUMENTS

AU 2006232206 A1 10/2006
CN 1060911 A 5/1992
(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.
(Continued)

*Primary Examiner* — Jennifer Doan
(74) *Attorney, Agent, or Firm* — Michael E. Carroll, Jr.

(57) ABSTRACT

Fiber optic networks having cable assemblies with a predetermined cable-to-connector orientation that cooperate with a multiport so that the cables of the cable assemblies may be routed to the multiport and organized in an efficient and compact manner. In one embodiment, the cable assembly has a fiber optic connector terminated to a cable with a cross-section so that a major axis of the cable cross-section is aligned with a keying portion and locking feature of fiber optic connector. The cable-to-connector orientation allows cable assemblies to be optically connected to the multiport so that the cables may be routed away from the multiport along the connection plane of the multiport in the fiber optic network.

25 Claims, 7 Drawing Sheets

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Yoshitaka |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Stephen |
| 4,783,137 A | 11/1988 | Kosman et al. |
| 4,842,363 A | 6/1989 | Margolin et al. |
| 4,844,570 A | 7/1989 | Takashi |
| 4,854,664 A | 8/1989 | McCartney |
| 4,856,867 A | 8/1989 | Gaylin |
| 4,902,238 A | 2/1990 | Iacobucci |
| 4,913,514 A | 4/1990 | Then |
| 4,921,413 A | 5/1990 | Blew |
| 4,944,568 A | 7/1990 | Bach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,995,836 A | 2/1991 | Hisao |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,317,663 A | 5/1994 | Beard et al. |
| 5,321,917 A | 6/1994 | Franklin et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,686 A | 7/1998 | Robinson et al. |
| 5,782,892 A | 7/1998 | Castle et al. |
| 5,789,701 A | 8/1998 | Wettengel et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Hayato |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,220,762 B1 | 4/2001 | Kanai et al. |
| 6,224,268 B1 | 5/2001 | Manning et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Allen |
| 6,264,374 B1 | 7/2001 | Selfridge et al. |
| 6,287,016 B1 | 9/2001 | Hans-Dieter |
| 6,305,849 B1 | 10/2001 | Roehrs et al. |
| 6,321,013 B1 | 11/2001 | Hardwick et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,402,388 B1 | 6/2002 | Imazu et al. |
| 6,404,962 B1 | 6/2002 | Hardwick et al. |

(56) References Cited

U.S. PATENT DOCUMENTS

| | | |
|---|---|---|
| 6,409,391 B1 | 6/2002 | Chang |
| 6,422,764 B1 | 7/2002 | Marrs et al. |
| 6,427,035 B1 | 7/2002 | Mahony |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,554,489 B2 | 4/2003 | Kent et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,848,838 B2 | 2/2005 | Doss et al. |
| 6,856,748 B1 | 2/2005 | Elkins et al. |
| 6,899,467 B2 | 5/2005 | McDonald et al. |
| 6,909,821 B2 | 6/2005 | Ravasio et al. |
| 6,916,120 B2 | 7/2005 | Zimmel et al. |
| 6,944,387 B2 | 9/2005 | Howell et al. |
| 6,962,445 B2 | 11/2005 | Zimmel et al. |
| 7,011,454 B2 | 3/2006 | Caveney et al. |
| 7,025,507 B2 | 4/2006 | de Marchi |
| 7,079,734 B2 | 7/2006 | Seddon et al. |
| 7,090,406 B2 | 8/2006 | Melton et al. |
| 7,090,407 B2 | 8/2006 | Melton et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,120,347 B2 | 10/2006 | Blackwell et al. |
| 7,137,742 B2 | 11/2006 | Theuerkorn et al. |
| 7,146,090 B2 | 12/2006 | Vo et al. |
| 7,150,567 B1 | 12/2006 | Luther et al. |
| 7,165,893 B2 | 1/2007 | Schmitz |
| 7,178,990 B2 | 2/2007 | Caveney et al. |
| 7,184,634 B2 | 2/2007 | Hurley et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,228,047 B1 | 6/2007 | Szilagyi et al. |
| 7,241,056 B1 | 7/2007 | Kuffel et al. |
| 7,266,265 B2 | 9/2007 | Gall et al. |
| 7,270,487 B2 | 9/2007 | Billman et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell et al. |
| 7,341,382 B2 | 3/2008 | Dye |
| 7,346,256 B2 * | 3/2008 | Marrs ............... G02B 6/3802 385/134 |
| 7,366,416 B2 | 4/2008 | Ramachandran et al. |
| 7,444,056 B2 | 10/2008 | Allen et al. |
| 7,463,803 B2 | 12/2008 | Cody et al. |
| 7,467,896 B2 | 12/2008 | Melton et al. |
| 7,489,849 B2 | 2/2009 | Reagan et al. |
| 7,497,896 B2 | 3/2009 | Bromet et al. |
| 7,512,304 B2 | 3/2009 | Gronvall et al. |
| 7,542,645 B1 | 6/2009 | Hua et al. |
| 7,565,055 B2 | 7/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,653,282 B2 | 1/2010 | Blackwell et al. |
| 7,654,747 B2 | 2/2010 | Theuerkorn et al. |
| 7,680,388 B2 | 3/2010 | Reagan et al. |
| 7,708,476 B2 | 5/2010 | Liu |
| 7,709,733 B2 | 5/2010 | Plankell |
| 7,712,971 B2 | 5/2010 | Lee et al. |
| 7,713,679 B2 | 5/2010 | Ishiduka et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,753,596 B2 | 7/2010 | Cox |
| 7,762,726 B2 | 7/2010 | Lu et al. |
| 7,785,015 B2 | 8/2010 | Melton et al. |
| 7,802,926 B2 | 9/2010 | Leeman et al. |
| 7,806,599 B2 | 10/2010 | Margolin et al. |
| 7,844,148 B2 | 11/2010 | Jenkins et al. |
| 7,844,160 B2 | 11/2010 | Reagan et al. |
| RE42,094 E | 2/2011 | Barnes et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,942,590 B2 | 5/2011 | Lu et al. |
| 8,025,445 B2 | 9/2011 | Rambow et al. |
| 8,213,761 B2 | 7/2012 | Gronvall et al. |
| 8,218,935 B2 | 7/2012 | Reagan et al. |
| 8,229,263 B2 | 7/2012 | Parris et al. |
| 8,238,706 B2 | 8/2012 | Kachmar |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,376,629 B2 | 2/2013 | Cline et al. |
| 8,408,811 B2 | 4/2013 | De et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,520,996 B2 | 8/2013 | Cowen et al. |
| 8,534,928 B2 | 9/2013 | Cooke et al. |
| 8,556,522 B2 | 10/2013 | Cunningham |
| 8,622,634 B2 | 1/2014 | Arnold et al. |
| 8,635,733 B2 | 1/2014 | Bardzilowski |
| 8,662,760 B2 | 3/2014 | Cline et al. |
| 8,678,668 B2 | 3/2014 | Cooke et al. |
| 8,687,930 B2 | 4/2014 | Mcdowell et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,770,861 B2 | 7/2014 | Smith et al. |
| 8,870,469 B2 | 10/2014 | Kachmar |
| 8,882,364 B2 | 11/2014 | Busse et al. |
| 8,917,966 B2 | 12/2014 | Thompson et al. |
| 8,992,097 B2 | 3/2015 | Koreeda et al. |
| 8,998,502 B2 | 4/2015 | Benjamin et al. |
| 9,158,074 B2 | 10/2015 | Anderson et al. |
| 9,158,075 B2 | 10/2015 | Benjamin et al. |
| 9,182,567 B2 | 11/2015 | Mullaney |

(56) References Cited

U.S. PATENT DOCUMENTS

| | | |
|---|---|---|
| 9,207,410 B2 | 12/2015 | Lee et al. |
| 9,285,550 B2 | 3/2016 | Nhep et al. |
| 9,297,974 B2 | 3/2016 | Valderrabano et al. |
| 9,310,570 B2 | 4/2016 | Busse et al. |
| 9,322,998 B2 | 4/2016 | Max |
| 9,383,539 B2 | 7/2016 | Power et al. |
| 9,405,068 B2 | 8/2016 | Graham et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,482,819 B2 | 11/2016 | Li et al. |
| 9,513,444 B2 | 12/2016 | Barnette et al. |
| 9,535,229 B2 | 1/2017 | Ott et al. |
| 9,541,711 B2 * | 1/2017 | Raven .............. G02B 6/3825 |
| 9,551,842 B2 | 1/2017 | Thomas |
| 9,618,704 B2 * | 4/2017 | Dean, Jr. .............. G02B 6/3891 |
| 9,618,718 B2 | 4/2017 | Islam |
| 9,638,871 B2 | 5/2017 | Bund et al. |
| 9,645,331 B1 | 5/2017 | Kim |
| 9,651,741 B2 | 5/2017 | Isenhour et al. |
| 9,664,862 B2 | 5/2017 | Lu et al. |
| 9,684,136 B2 | 6/2017 | Cline et al. |
| 9,684,138 B2 | 6/2017 | Yu |
| 9,696,500 B2 | 7/2017 | Barnette et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,810,855 B2 | 11/2017 | Cox et al. |
| 9,810,856 B2 | 11/2017 | Graham et al. |
| 9,829,668 B2 | 11/2017 | Coenegracht et al. |
| 9,857,540 B2 | 1/2018 | Ahmed et al. |
| 9,864,151 B2 | 1/2018 | Lu |
| D810,029 S | 2/2018 | Robert et al. |
| 9,891,391 B2 | 2/2018 | Yasuhiro |
| 9,910,236 B2 | 3/2018 | Cooke et al. |
| 9,933,582 B1 | 4/2018 | Lin |
| 9,964,715 B2 | 5/2018 | Yu |
| 9,983,374 B2 | 5/2018 | Li et al. |
| 10,031,302 B2 | 7/2018 | Ji et al. |
| 10,038,946 B2 | 7/2018 | Smolorz |
| 10,061,090 B2 | 8/2018 | Coenegracht |
| 10,073,224 B2 | 9/2018 | Tong et al. |
| 10,114,176 B2 | 10/2018 | Gimblet et al. |
| 10,180,541 B2 | 1/2019 | Coenegracht et al. |
| 10,209,454 B2 | 2/2019 | Isenhour et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Philippe |
| 10,353,154 B2 | 7/2019 | Ott et al. |
| 10,353,156 B2 | 7/2019 | Hill et al. |
| 10,359,577 B2 | 7/2019 | Dannoux et al. |
| 10,401,575 B2 | 9/2019 | Daily et al. |
| 10,401,578 B2 | 9/2019 | Coenegracht |
| 10,409,007 B2 | 9/2019 | Kadar-Kallen et al. |
| 10,422,962 B2 | 9/2019 | Coenegracht |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| 10,495,822 B2 | 12/2019 | Ponharith |
| 10,520,683 B2 | 12/2019 | Nhep |
| 10,578,821 B2 | 3/2020 | Ott et al. |
| 10,606,006 B2 | 3/2020 | Hill et al. |
| 10,613,278 B2 | 4/2020 | Kempeneers et al. |
| 10,656,347 B2 | 5/2020 | Kato |
| 10,712,516 B2 | 7/2020 | Courchaine et al. |
| 10,739,534 B2 | 8/2020 | Murray et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Ponharith |
| 10,859,781 B2 | 12/2020 | Hill et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 2001/0019654 A1 | 9/2001 | Waldron et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0081077 A1 | 6/2002 | Nault |
| 2002/0122653 A1 | 9/2002 | Donaldson et al. |
| 2002/0131721 A1 | 9/2002 | Gaio et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0094298 A1 | 5/2003 | Morrow et al. |
| 2003/0099448 A1 | 5/2003 | Gimblet |
| 2003/0123813 A1 | 7/2003 | Ravasio et al. |
| 2004/0047566 A1 | 3/2004 | McDonald et al. |
| 2004/0052474 A1 | 3/2004 | Lampert et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0252954 A1 | 12/2004 | Ginocchio et al. |
| 2005/0019031 A1 | 1/2005 | Ye et al. |
| 2005/0036786 A1 | 2/2005 | Ramachandran et al. |
| 2005/0054237 A1 | 3/2005 | Gladd et al. |
| 2005/0084215 A1 | 4/2005 | Grzegorzewska et al. |
| 2005/0123422 A1 | 6/2005 | Lilie |
| 2005/0129379 A1 | 6/2005 | Reagan et al. |
| 2005/0175307 A1 | 8/2005 | Battey et al. |
| 2005/0213902 A1 | 9/2005 | Parsons |
| 2005/0232552 A1 | 10/2005 | Takahashi et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0120672 A1 | 6/2006 | Cody et al. |
| 2006/0127016 A1 | 6/2006 | Baird et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 8/2006 | Dye |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0077010 A1 | 4/2007 | Melton et al. |
| 2007/0098343 A1 | 5/2007 | Miller et al. |
| 2007/0189674 A1 | 8/2007 | Scheibenreif et al. |
| 2008/0020532 A1 | 1/2008 | Monfray et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0232743 A1 | 9/2008 | Gronvall et al. |
| 2008/0240658 A1 | 10/2008 | Leeman et al. |

(56) References Cited

U.S. PATENT DOCUMENTS

| | | |
|---|---|---|
| 2008/0264664 A1 | 10/2008 | Dinh et al. |
| 2008/0273837 A1 | 11/2008 | Margolin et al. |
| 2009/0060421 A1 | 3/2009 | Parikh et al. |
| 2009/0148101 A1 | 6/2009 | Lu et al. |
| 2009/0148104 A1 | 6/2009 | Lu et al. |
| 2009/0156041 A1 | 6/2009 | Radle |
| 2009/0185835 A1 | 7/2009 | Park et al. |
| 2009/0245743 A1 | 10/2009 | Cote et al. |
| 2009/0263097 A1 | 10/2009 | Solheid et al. |
| 2009/0317039 A1 | 12/2009 | Blazer et al. |
| 2010/0008909 A1 | 1/2010 | Siadak et al. |
| 2010/0014813 A1 | 1/2010 | Ito et al. |
| 2010/0014867 A1 | 1/2010 | Ramanitra et al. |
| 2010/0015834 A1 | 1/2010 | Siebens |
| 2010/0040338 A1 | 2/2010 | Sek |
| 2010/0054680 A1 | 3/2010 | Lochkovic et al. |
| 2010/0074578 A1 | 3/2010 | Imaizumi et al. |
| 2010/0092136 A1 | 4/2010 | Nhep |
| 2010/0172616 A1 | 7/2010 | Lu et al. |
| 2010/0197222 A1 | 8/2010 | Scheucher |
| 2010/0232753 A1 | 9/2010 | Parris et al. |
| 2010/0247053 A1 | 9/2010 | Cowen et al. |
| 2010/0266245 A1 | 10/2010 | Sabo |
| 2010/0272399 A1 | 10/2010 | Griffiths et al. |
| 2010/0303426 A1 | 12/2010 | Davis |
| 2010/0303427 A1 | 12/2010 | Rambow et al. |
| 2010/0310213 A1 | 12/2010 | Lewallen et al. |
| 2011/0019964 A1 | 1/2011 | Nhep et al. |
| 2011/0047731 A1 | 3/2011 | Sugita et al. |
| 2011/0069932 A1 | 3/2011 | Overton et al. |
| 2011/0108719 A1 | 5/2011 | Ford et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0262099 A1 | 10/2011 | Castonguay et al. |
| 2011/0299814 A1 | 12/2011 | Nakagawa |
| 2012/0002925 A1 | 1/2012 | Nakagawa |
| 2012/0008909 A1 | 1/2012 | Mertesdorf et al. |
| 2012/0106912 A1 | 5/2012 | McGranahan et al. |
| 2012/0183268 A1 | 7/2012 | De et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2013/0004122 A1 | 1/2013 | Kingsbury |
| 2013/0034333 A1 | 2/2013 | Holmberg et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0170834 A1 | 7/2013 | Cho et al. |
| 2013/0236139 A1 | 9/2013 | Chen et al. |
| 2014/0016902 A1 | 1/2014 | Pepe et al. |
| 2014/0050446 A1 | 2/2014 | Jun-Fu |
| 2014/0079356 A1 | 3/2014 | Pepin et al. |
| 2014/0133806 A1 | 5/2014 | Hill et al. |
| 2014/0133807 A1 | 5/2014 | Katoh |
| 2014/0153876 A1 | 6/2014 | Dendas et al. |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0241689 A1 | 8/2014 | Bradley et al. |
| 2014/0294395 A1 | 10/2014 | Waldron et al. |
| 2014/0328559 A1 | 11/2014 | Kobayashi et al. |
| 2014/0348467 A1 | 11/2014 | Cote et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0144883 A1 | 5/2015 | Sendelweck |
| 2015/0185423 A1 | 7/2015 | Matsui et al. |
| 2015/0253528 A1 | 9/2015 | Corbille et al. |
| 2015/0268423 A1 | 9/2015 | Burkholder et al. |
| 2015/0268434 A1 | 9/2015 | Barnette et al. |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154186 A1 | 6/2016 | Gimblet et al. |
| 2016/0161688 A1 | 6/2016 | Nishimura |
| 2016/0161689 A1 | 6/2016 | Nishimura |
| 2016/0209599 A1 | 7/2016 | Van et al. |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0306122 A1 | 10/2016 | Tong et al. |
| 2017/0038538 A1 | 2/2017 | Isenhour et al. |
| 2017/0059784 A1 | 3/2017 | Gniadek et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0219782 A1 | 8/2017 | Nishimura |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261699 A1 | 9/2017 | Compton et al. |
| 2017/0285279 A1 | 10/2017 | Daems et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2018/0079569 A1 | 3/2018 | Joseph |
| 2018/0081127 A1 | 3/2018 | Coenegracht |
| 2018/0180831 A1 | 6/2018 | Blazer et al. |
| 2019/0004251 A1 | 1/2019 | Dannoux et al. |
| 2019/0004252 A1 | 1/2019 | Rosson |
| 2019/0004256 A1 | 1/2019 | Rosson |
| 2019/0004258 A1 | 1/2019 | Dannoux et al. |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0170961 A1 | 6/2019 | Coenegracht et al. |
| 2019/0187396 A1 | 6/2019 | Finnegan et al. |
| 2020/0012051 A1 | 1/2020 | Coenegracht et al. |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057224 A1 | 2/2020 | Dannoux et al. |
| 2020/0057723 A1 | 2/2020 | Chirca et al. |
| 2020/0103608 A1 | 4/2020 | Johnson et al. |
| 2020/0110229 A1 | 4/2020 | Dannoux et al. |
| 2020/0116952 A1 | 4/2020 | Rosson |
| 2020/0116953 A1 | 4/2020 | Rosson |
| 2020/0116958 A1 | 4/2020 | Dannoux et al. |
| 2020/0124805 A1 | 4/2020 | Rosson et al. |
| 2020/0124812 A1 | 4/2020 | Dannoux et al. |
| 2020/0241211 A1 | 7/2020 | Shonkwiler et al. |
| 2020/0348476 A1 | 11/2020 | Hill et al. |
| 2020/0371306 A1 | 11/2020 | Mosier et al. |
| 2020/0393629 A1 | 12/2020 | Hill et al. |

FOREIGN PATENT DOCUMENTS

| | | |
|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |

(56) References Cited

FOREIGN PATENT DOCUMENTS

| | | | |
|---|---|---|---|
| CN | 101111790 A | 1/2008 |
| CN | 101195453 A | 6/2008 |
| CN | 201404194 Y | 2/2010 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 104064903 A | 9/2014 |
| CN | 104280830 A | 1/2015 |
| CN | 104603656 A | 5/2015 |
| CN | 105467529 A | 4/2016 |
| CN | 110954996 A | 4/2020 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |
| EP | 0856761 A1 | 8/1998 |
| EP | 0940700 A2 | 9/1999 |
| EP | 0949522 A2 | 10/1999 |
| EP | 0957381 A1 | 11/1999 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3207223 A1 | 8/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-106765 A | 4/1993 |
| JP | 05-142439 A | 6/1993 |
| JP | 05-297246 A | 11/1993 |
| JP | 06-320111 A | 11/1994 |
| JP | 07-318758 A | 12/1995 |
| JP | 08-050211 A | 2/1996 |
| JP | 08-054522 A | 2/1996 |
| JP | 08-062432 A | 3/1996 |
| JP | 08-292331 A | 11/1996 |
| JP | 09-049942 A | 2/1997 |
| JP | 09-135526 A | 5/1997 |
| JP | 09-159867 A | 6/1997 |
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11-326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 2002-250987 A | 9/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |
| JP | 2004-361521 A | 12/2004 |
| JP | 2005-024789 A | 1/2005 |
| JP | 2005-031544 U | 2/2005 |
| JP | 2005-077591 A | 3/2005 |
| JP | 2005-114860 A | 4/2005 |
| JP | 2005-520987 A | 7/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |

(56) References Cited

FOREIGN PATENT DOCUMENTS

| | | |
|---|---|---|
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |
| JP | 2016-109819 A | 6/2016 |
| JP | 2016-156916 A | 9/2016 |
| JP | 3207223 U | 11/2016 |
| JP | 3207233 U | 11/2016 |
| KR | 10-2013-0081087 A | 7/2013 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/163052 A1 | 12/2012 |
| WO | 2013/016042 A1 | 1/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/047508 A1 | 4/2015 |
| WO | 2015/144883 A1 | 10/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |

OTHER PUBLICATIONS

Clearfield, "Fieldshield Optical Fiber Protection System: Installation Manual." for part No. 016164. Last Updated Dec. 2014. 37 pgs.
Clearfield, "FieldShield SC and LC Pushable Connectors," Last Updated Jun. 1, 2018, 2 pgs.
Clearfield, "FieldShield SmarTerminal: Hardened Pushable Connectors" Last Updated Jun. 29, 2018, 2 pgs.
Coaxum, L et al., U.S. Appl. No. 62/341,947, "Fiber Optic Multiport Having Different Types of Ports for Multi-Use," filed May 26, 2016.
Coming Cable Systems, "SST Figure-8 Drop Cables 1-12 Fibers", Preliminary Product Specifications, 11 pgs. (2002).
Coming Cable Systems, "SST-Drop (armor) Cables 1-12 Fibers", Product Specifications, 2 pgs. (2002).
Coming Cable Systems, "SST-Drop (Dielectric) Cables 1-12 Fibers", Product Specifications, 2 pgs. (2002).
Faulkner et al. "Optical networks for local lopp applications," J. Lightwave Technol.0733-8724 7(11), 17411751 (1989).
Fiber Systems International: Fiber Optic Solutions, data, "TFOCA-II 4-Channel Fiber Optic Connector" sheet. 2 pgs.
Infolite—Design and Data Specifications, 1 pg. Retrieved Feb. 21, 2019.
Nawata, "Multimode and Single-Mode Fiber Connectors Technology"; IEEE Journal of Quantum Electronics, vol. QE-16, No. 6 Published Jun. 1980.
Ramanitra et al. "Optical access network using a self-latching variable splitter remotely powered through an optical fiber link," Optical Engineering 46(4) pp. 45007-1-45007-9, Apr. 2007.
Ratnam et al. "Burst switching using variable optical splitter based switches with wavelength conversion," ICIIS 2017—Poeceedings Jan. 2018, pp. 1-6.
Schneier, Bruce; "Applied Cryptography: Protocols, Algorithms, and Source Code in C," Book. 1995 Sec. 10.3, 12.2, 165 pgs.
Stratos: Ughtwave., "Innovation Brought to Light", Hybrid HMA Series, Hybrid Multi Application, 2 pgs.
Wang et al. "Opto-VLSI-based dynamic optical splitter," Electron. Lett.0013-5194 10.1049/el:20046715 40(22), 14451446 (2004).
Xiao et al. "1xN wavelength selective adaptive optical power splitter for wavelength-division-multiplexed passive optical networks," Optics & Laser Technology 68, pp. 160-164, May 2015.

* cited by examiner

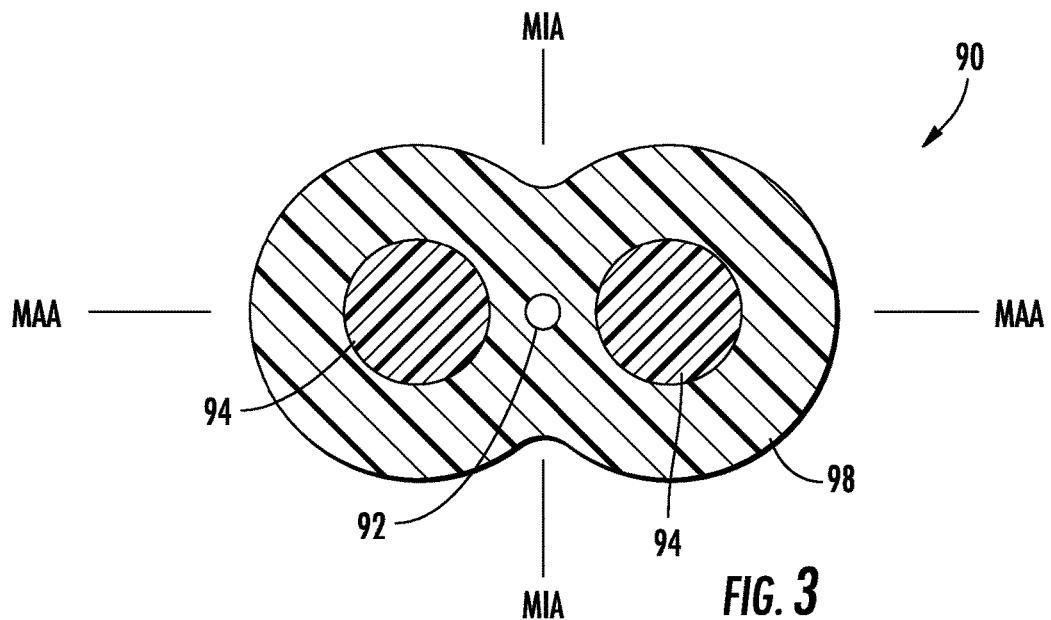
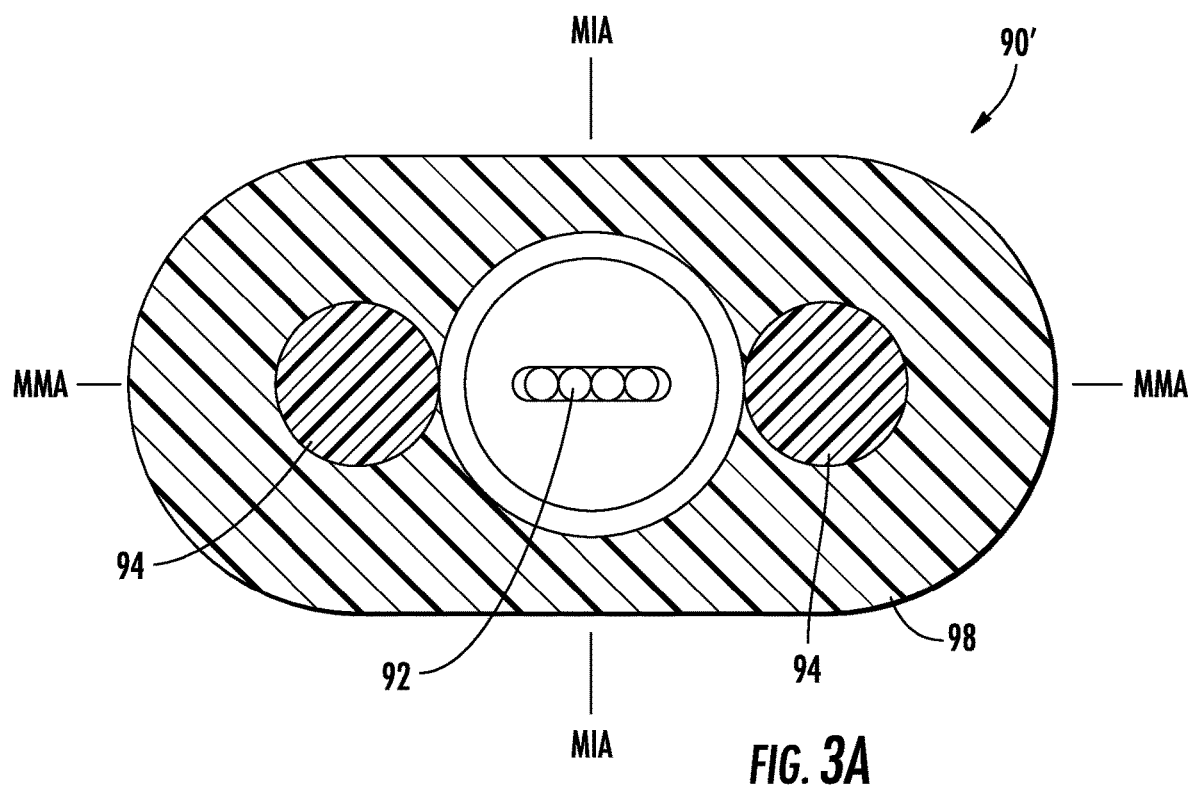

FIBER OPTIC NETWORKS USING MULTIPORTS AND CABLE ASSEMBLIES WITH CABLE-TO-CONNECTOR ORIENTATION

RELATED APPLICATIONS

This application claims the benefit of priority of U.S. Provisional Application Ser. No. 62/880,844, filed on Jul. 31, 2019, the content of which is relied upon and incorporated herein by reference in its entirety.

BACKGROUND

The disclosure is directed to fiber optic networks having cable assemblies and multiports that improve network deployment. More specifically, the disclosure is directed to fiber optic networks having cable assemblies comprising a fiber optic connector-to-cable orientation that allows routing of the cables in an organized fashion along a connection plane of the multiport.

Optical fiber is increasingly being used for a variety of applications, including but not limited to broadband voice, video, and data transmission. As bandwidth demands increase optical fiber is migrating toward subscribers in outdoor communication networks such as in fiber to the premises applications such as FTTx, 5G deployments and the like. To address this need for making optical connections in communication networks for outdoor environments hardened fiber optic connectors were developed. As used herein, the term "hardened" describes a connector or port intended for making an environmentally sealed optical connection suitable for outdoor use, and the term "non-hardened" describes a connector or receptacle port that is not intended for making an environmentally sealed optical connection such as the well-known SC connector.

Network operators face many challenges for building, deploying and connecting fiber optic connections in the outside plant communication network. Besides right of way access for the communication networks, network operators may have limited space to available on existing poles or in existing vaults for mounting devices. Initially, conventional hardened fiber optic connectors were typically mounted on robust and relatively stiff fiber optic cables, and slack storage for these fiber optic cables may also consume limited space or become unsightly in aerial deployments. Thus, the prior art fiber optic networks can have unorganized deployment that may also take up large amounts of space on in aerial or buried deployments due to the cable routing and slack storage management of the cables.

Consequently, there exists an unresolved need for fiber optic assemblies in networks that may be deployed in a space-saving manner while also allowing quick and easy deployment while also being aesthetically pleasing.

SUMMARY

The disclosure is directed to fiber optic networks having at least one cable assembly and a multiport. The concepts disclosed allow a compact form-factor for optical connectivity in the network for numerous applications and variations as desired. Specifically, the concepts allow the cable assemblies routed to the multiport to be arranged in an organized and efficient manner so that the cables of the cable assemblies may be grouped together, bundled or otherwise moved along the connection plane of the multiport.

One aspect of the disclosure is directed to a fiber optic network comprising at least one cable assembly and a multiport. The cable assembly comprising a fiber optic connector and a cable terminated to the fiber optic connector. The fiber optic connector comprises a housing and a ferrule. The housing comprises a rear end and front end with a longitudinal passageway extending between the rear end to the front end with a keying portion disposed on an opposite side from a locking feature of the housing. The cable comprises at least one optical fiber and a cable jacket. The cable jacket comprises a cross-section having a major axis and a minor axis, and the cross-section is defined with respect to the minor axis and the major axis is aligned with the keying portion and the locking feature of the connector. The multiport comprises a linear array of connection ports disposed on the multiport that define a connection plane aligned on the centerlines of the linear array of connection ports. The fiber optic connector is received in the at least one connection port so that the major axis of the cable is perpendicular to the connection plane and the cable is routed away from the multiport along the connection plane.

Another aspect of the disclosure is directed to a fiber optic network comprising at least one cable assembly and a multiport. The cable assembly comprising a fiber optic connector and a cable terminated to the fiber optic connector. The fiber optic connector comprises a housing and a ferrule. The housing comprises a rear portion comprising a rear end and a front portion comprising a front end with a longitudinal passageway extending from the rear end and to the front end with a keying portion disposed on an opposite side from a locking feature of the housing. A transition region is disposed between the rear portion and the front portion, and the transition region comprises a threaded portion. The cable comprises at least one optical fiber and a cable jacket. The cable jacket comprises a cross-section having a major axis and a minor axis, and the cross-section is defined with respect to the minor axis and the major axis is aligned with the keying portion and the locking feature of the connector. The multiport comprises a linear array of connection ports disposed on the multiport that define a connection plane aligned on the centerlines of the linear array of connection ports. The fiber optic connector is received in the at least one connection port so that the major axis of the cable is perpendicular to the connection plane and the cable is routed away from the multiport along the connection plane.

Yet another aspect of the disclosure is directed to a fiber optic network comprising at least one cable assembly and a multiport. The cable assembly comprising a fiber optic connector and a cable terminated to the fiber optic connector. The fiber optic connector comprises a housing and a ferrule. The housing comprises a rear portion comprising a rear end and a front portion comprising a front end with a longitudinal passageway extending from the rear end and to the front end with a keying portion disposed on an opposite side from a locking feature of the housing. The locking feature is integrally formed in the rear portion and a transition region is disposed between the rear portion and the front portion, and the transition region comprises a threaded portion. The cable comprises at least one optical fiber and a cable jacket. The cable jacket comprises a cross-section having a major axis and a minor axis, and the cross-section is defined with respect to the minor axis and the major axis is aligned with the keying portion and the locking feature of the connector. The multiport comprises a linear array of connection ports disposed on the multiport that define a connection plane aligned on the centerlines of the linear array of connection ports. The fiber optic connector is received in the at least one connection port so that the major axis of the cable is perpendicular to the connection plane and the cable is routed away from the multiport along the connection plane.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure and are incorporated into and constitute a part of this specification. The drawings illustrate various embodiments and together with the description serve to explain the principles and operation.

BRIEF DESCRIPTION OF THE FIGURES

FIG. 3 depicts a cross-section of the fiber optic cable of FIG. 2 defining a major axis and a minor axis according to the disclosure;

FIG. 3A depicts another explanatory cross-section of a fiber optic cable defining a major axis and a minor axis according to the disclosure;

DETAILED DESCRIPTION

Figure 1:
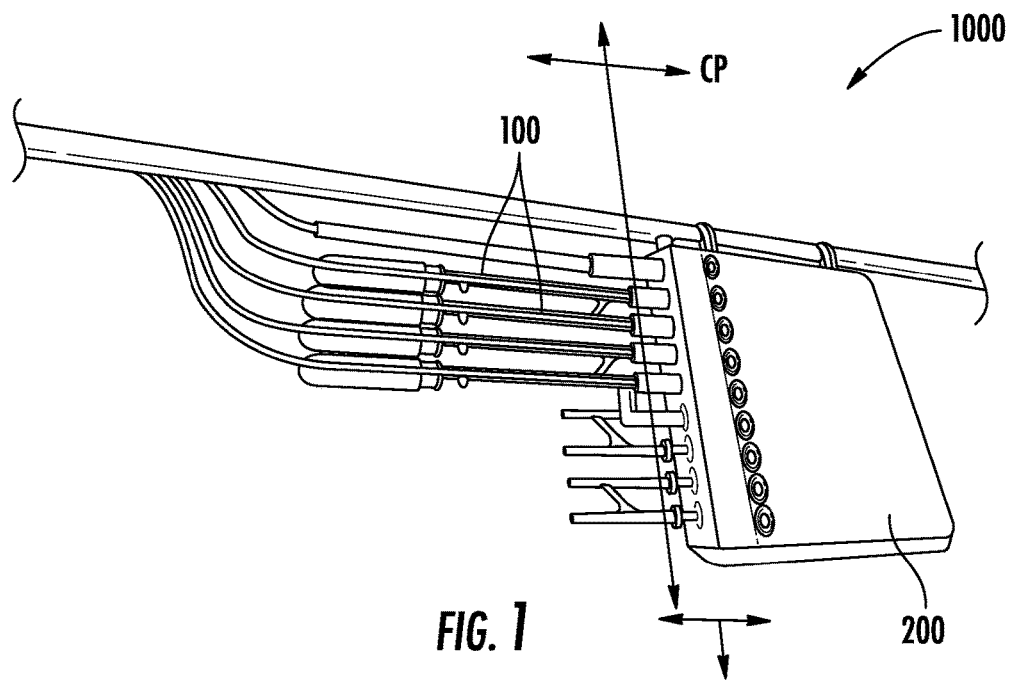
FIG. 1 is a perspective view of a portion of a fiber optic network comprising a representative multiport along with cable assemblies having their connectors attached to the connection ports so that the fiber optic cables have a vertical orientation with the key of the connection port according to the disclosure.

Reference will now be made in detail to the embodiments of the disclosure, examples of which are illustrated in the accompanying drawings. Whenever possible, like reference numbers will be used to refer to like components or parts.

The concepts disclosed advantageously provide fiber optic networks comprising one or more cable assemblies that cooperate with a multiport for deploying and routing fiber optic cables in the network from the multiport in a compact and efficient manner. The concepts disclosed may be useful for aerial, buried or other deployments in the fiber optic network. The fiber optic networks disclosed are explained and depicted comprising a fiber optic connector with a housing and a ferrule that are terminated to an end of a fiber optic cable having a cross-section with a major axis and a minor axis that impart a preferential bend plane to the cable. The cross-section of the cable has a major axis that is aligned with a keying portion and the locking feature on the housing of the fiber optic connector. Consequently, the preferred bend direction of the fiber optic cable has a predetermined orientation that is aligned so that the major axis of the cable is generally vertical or perpendicular to a connection plane of the ports disposed on the multiport so that the cables are routed away from the multiport along the connection plane. As used herein, "generally perpendicular" means perpendicular to within ±10 degrees, and "perpendicular" means perpendicular to within ±5 degrees. Consequently, cables may be organized and routed in an organized and efficient manner for the routing of cables to a multiport in a fiber optic network.

The cable assembly has the housing of the fiber optic connector clocked in a predetermined manner with respect to the cross-section of the cable so it may be received in the multiport for forming a portion of a fiber optic network. In particular, the cross-section of the cable has a major axis that is aligned with keying portion and locking features of the housing of the connector. The housing of the connector may also be defined by a rear portion (RP) and a front portion (FP) along with a transition region (TR) disposed between the rear portion (RP) and the front portion (FP) of the housing.

In one explanatory example, the housing of the fiber optic connector comprises a part of the rear portion (RP) having a round cross-section (RCS) and a part of the front portion having a non-round cross-section (NRCS). The front portion (FP) or the rear portion (RP) of the housing may be further defined in various configurations as disclosed herein while retaining a part of the rear portion (RP) with the round cross-section (RCS) and a part of the front portion (FP) having a non-round cross-section (NRCS). Moreover, the housings may have the keying portion and locking features that aid in the proper alignment or orientation of the connector in the multiport without significantly changing the primitive form-factors (i.e., RCS, NRCS) of the housings that are disclosed. By way of explanation, even though a round cross-section of the housing may include another feature such as a keying portion configured as a key or a keyway it is still considered to be a round cross-section. Additionally, housing may have locking features for securing the optical mating with the multiport. The housing may also include threads for securing a dust cap or modifying the fiber optic connector to a second footprint using other components.

The housing footprints for connectors disclosed herein may be still further defined by other geometry of the housing(s). For instance, the front portion (FP) of the housing may comprise another cross-section portion (ACSP). By way of explanation, the another cross-sectional portion (ACSP) may comprise a SC footprint. The SC footprint can, in part, be similar to the inner housing of a conventional SC connector. This particular housing footprint is useful for allowing the connectors disclosed to be backwards compatible into existing devices or ports using well-established connector footprints as desired.

Housings may also define further features such as the transition region disposed between the rear portion and the front portion comprising an asymmetric transition with respect to a longitudinal axis of the housing. Likewise, other features on the housing may define the housing as asymmetric for orientation or mating with devices or ports.

Likewise, the cable assemblies disclosed may be hybrid designs with both optical and electrical connectivity. Electrical connectivity may be provided by contacts on or in a portion of the housing of the connector and may be useful for power or data as desired for applications such as FTTx, 5G networks, industrial applications or the like. These and other additional concepts are discussed and disclosed in illustrative detail with reference to FIGS. herein.

Figure 2:
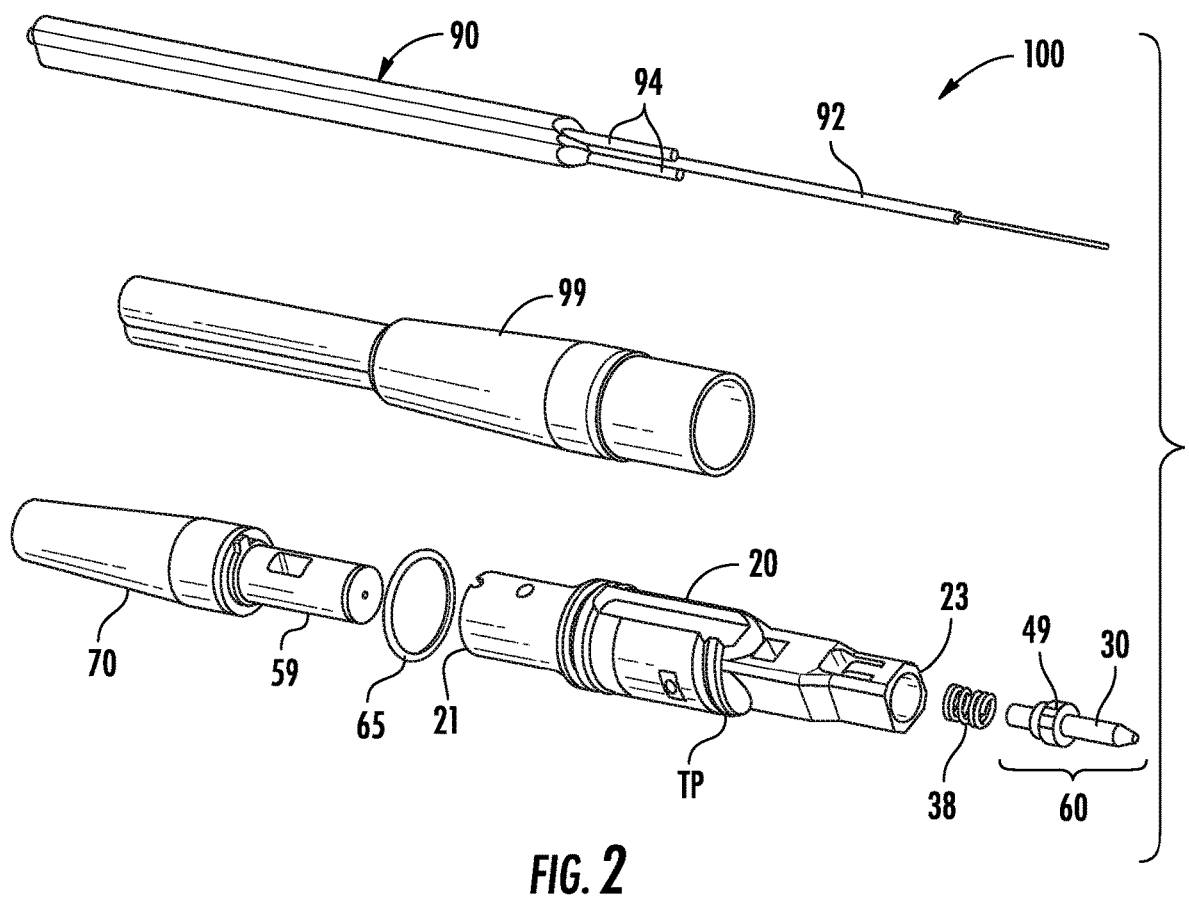
FIG. 2 is a partially exploded view of a cable assembly that terminates a representative fiber optic cable to a fiber optic connector so that a major axis of the fiber optic cable cross-section is oriented with respect to a keying portion and locking feature of the connector.
Figure 4:
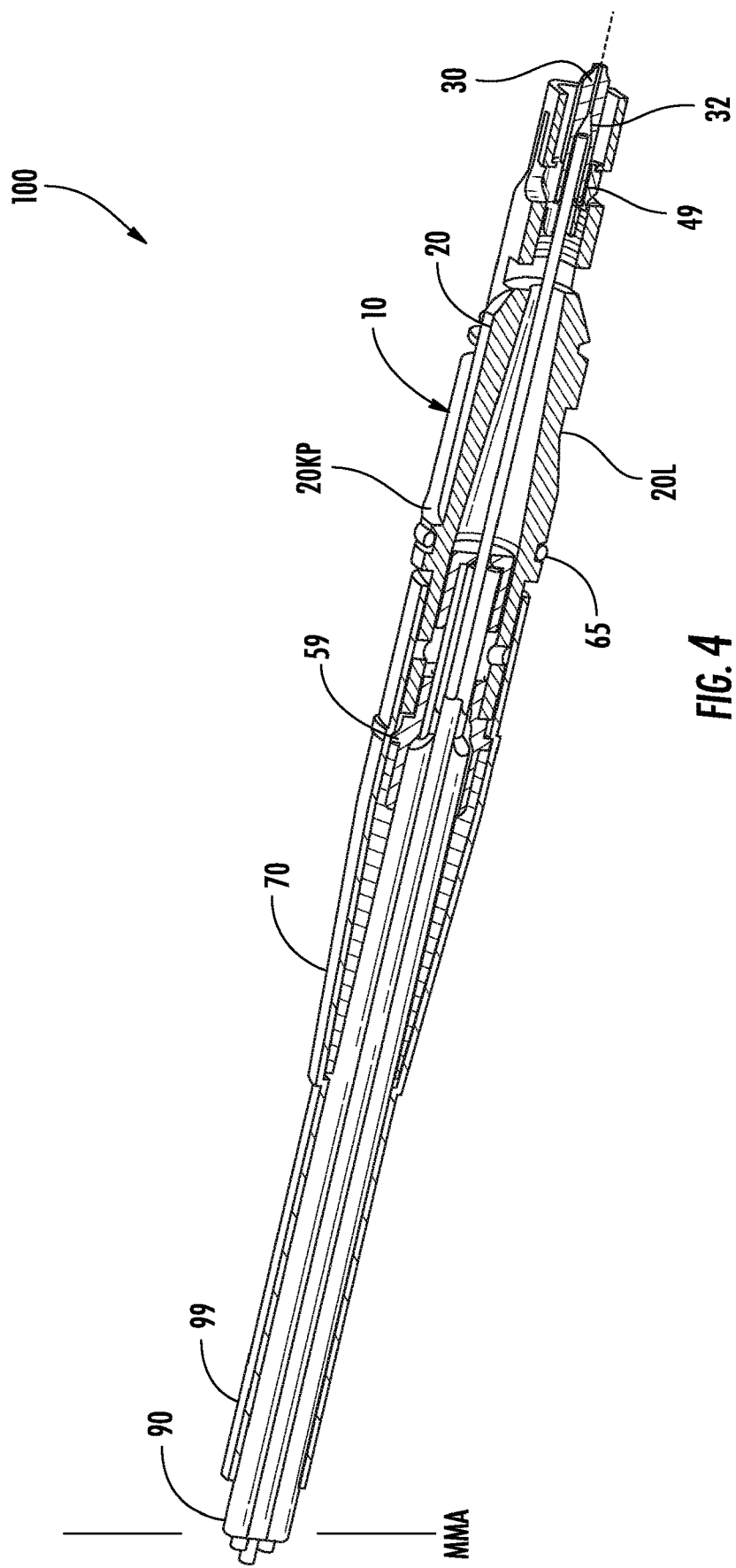
FIG. 4 depicts a vertical sectional view of cross-section of the cable assembly FIG. 2 showing the major axis of the fiber optic cable aligned with the keying portion and the locking feature of the fiber optic connector according to the disclosure.

FIG. 1 shows a portion of a fiber optic network 1000 comprising at least one cable assembly 100 and a multiport 200. The cable assembly 100 comprises a fiber optic connector 10 and a fiber optic cable 90. The fiber optic connector 10 is terminated to an end of the fiber optic cable 90 to form the cable assembly 100. FIG. 2 shows a partially exploded view of cable assembly 100, and FIGS. 3 and 3A show representative cross-sections of the fiber optic cable 90,90' comprising a cross-section having a major axis MAA and a minor axis MIA that impart a preferential bending plane for the cable. FIG. 4 depicts a cross-sectional view of the cable assembly 100 showing the orientation of the fiber optic cable 90 to fiber optic connector 10 when assembled (i.e., clocking of the major axis MAA of the fiber optic cable to with the keying portion and the locking feature of the fiber optic connector 10.

Figure 7:
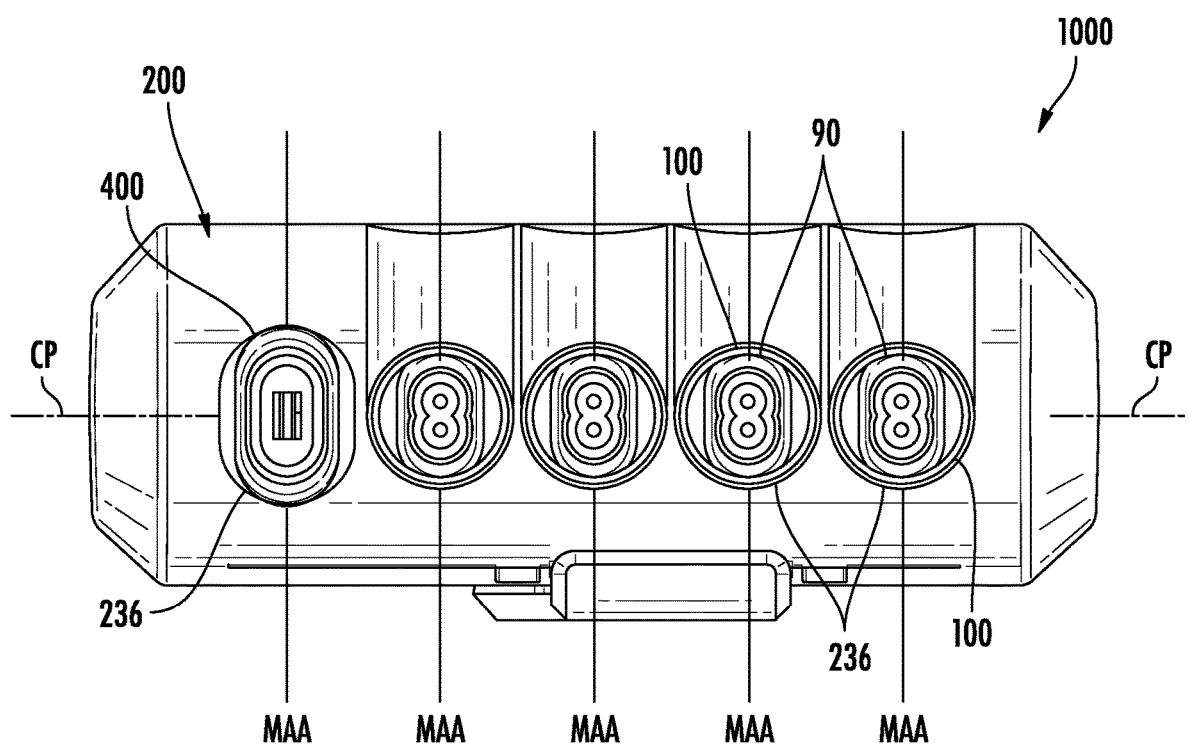
FIG. 7 is an assembled cross-sectional view of the cable assembly showing the major axis of the fiber optic cable aligned with keying portion and locking feature of the housing of the fiber optic connector.

As shown in FIG. 1, one or more fiber optic connectors 10 on the respective terminated ends of the cable assemblies 100 may be attached to respective ports 236 of the multiport 200 to form a portion of the fiber optic network 1000. Multiports 200 may have any suitable number of connection ports 236 for receiving the fiber optic connectors 10 of respective cable assemblies 100. The connection ports 236 may be arranged as one or more linear arrays of connection ports 236 on multiport 200. Each linear array of connection ports 236 disposed on the multiport 200 define a connection plane CP aligned on the centerlines of the connection ports 236 of the linear array such as shown in FIG. 7. Consequently, when the fiber optic connector 10 of the cable assembly is received in the connection port 236 of multiport 200 a major axis MAA of the fiber optic cable 90 may be routed away from the multiport 200 along the defined connection plane CP of the multiport 200 as shown in FIG. 1. This fiber optic network construction is advantageous since it allows multiple cables 90 to easily and quickly be strapped or zip-tied together in a known orientation to save space and maintain an organized network where space may be at a premium. Thus, the fiber optic network disclosed herein are advantageous over conventional fiber optic networks that have the fiber optic cables exiting from the multiport in different orientations or directions and take up excess space and cause routing concerns and issues in confined spaces.

FIG. 2 is a partially exploded view of a cable assembly 100 that terminates a representative fiber optic cable (hereinafter cable) 90 to a fiber optic connector 10. Cable 90 comprises at least one optical fiber 92 and a cable jacket 98 and may include other components or not. The cable 90 comprises a cross-section having a major axis MAA and a minor axis MIA as shown in FIG. 3. As shown in FIG. 3, cable 90 may further comprise one or more strength members 94. The strength members 94 may be any suitable materials such as glass-reinforced rods, aramid yarns, fiberglass, metal wires or the like if used. The major axis MAA of the cable is defined by the longest line through the cable cross-section that passes through the cable center point. In cable 90 the strength members 94 are aligned on the major axis MAA as shown. The minor axis MIA is defined by the axis passing through the cable center point and orthogonal to the major axis MAA. The cross-section of the fiber optic cable 90, 90' imparts a preferential bend plane for the cable that is aligned with the housing 20 of the connector such as with the keying portion or the locking feature as desired for cable management when disposed in a respective port of the fiber optic network 1000.

Figure 5:
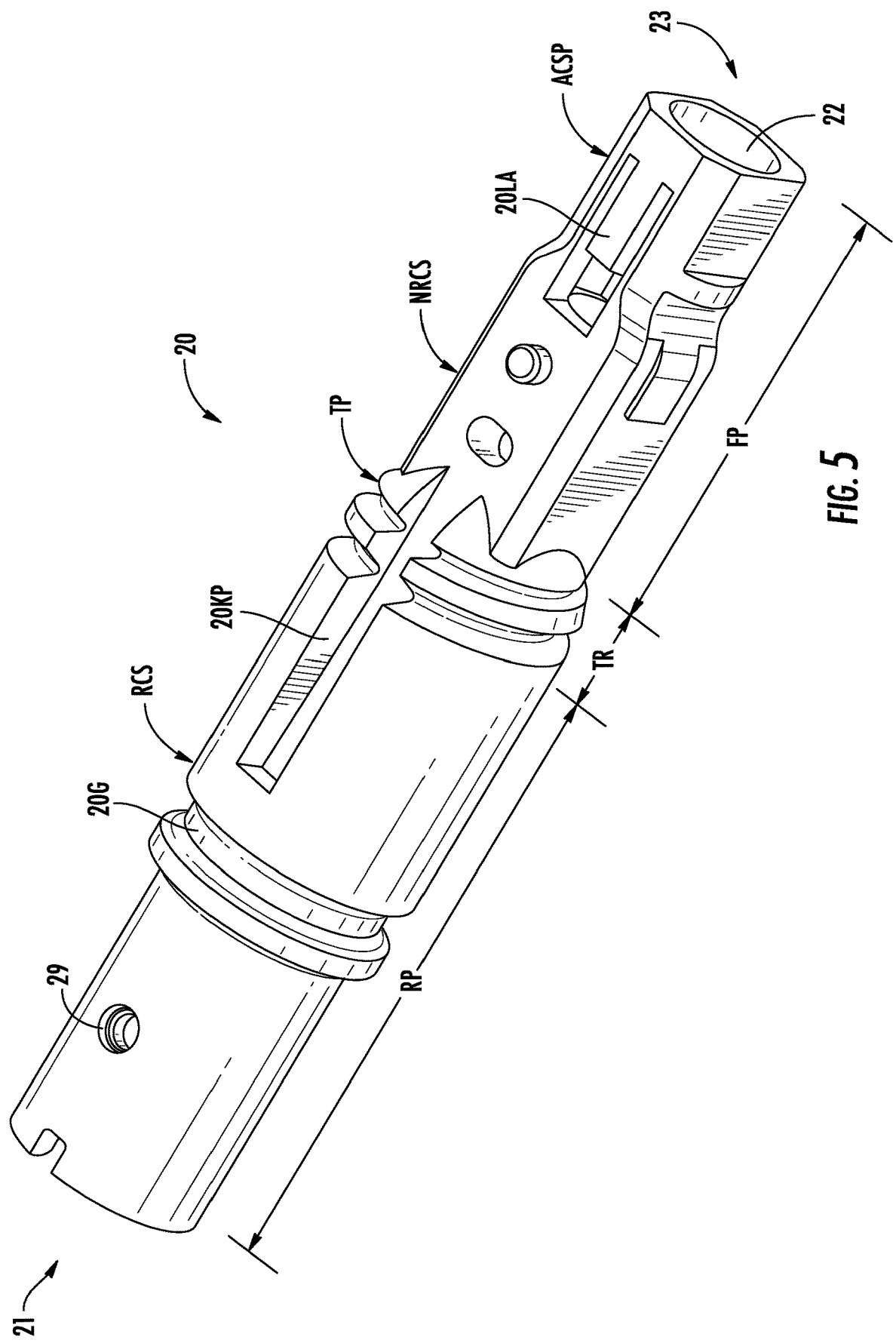
FIGS. 5 and 6 are perspective views of a representative housing for the fiber optic connector respectively showing the keying portion and locking feature according to the disclosure.
Figure 6:
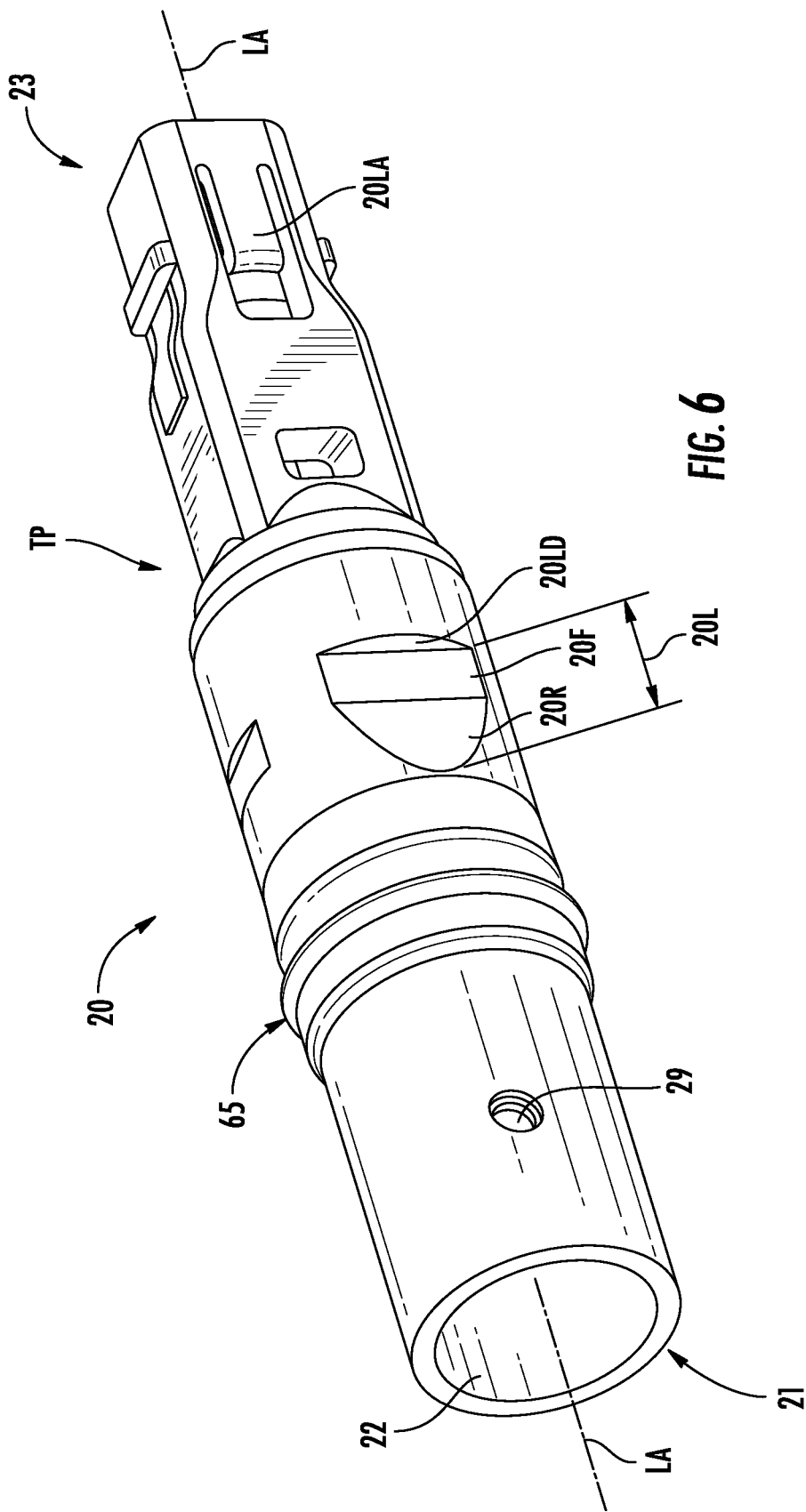

Returning to FIG. 2, fiber optic connector 10 comprises a housing 20 and a ferrule 30. As shown in FIGS. 5 and 6, the housing 20 comprises a rear end 21 and a front end 23 with a longitudinal passageway 22 extending from the rear end 21 to the front end 23. The housing 20 also comprises a keying portion 20KP that may be disposed on an opposite side from a locking feature 20L or not as desired. Disposed on an opposite side means that the keying portion 20KP is about 180 degrees from the locking feature 20L in a rotational orientation about the housing 20, but other arrangements of the locking feature and keying portions are possible using the concepts disclosed herein. Ferrule 30 comprises a fiber bore 32 extending from a rear end 31 to a front end 33. The passageway 22 of housing 20 allows one or more optical fibers of cable 90 to pass through the housing 20 for insertion into fiber bore 32 of ferrule 30 such as depicted in FIG. 4.

When the connector 10 is terminated to the cable 90 the major axis MAA of the cable cross-section CS is oriented relative to one or more of a keying portion 20KP and locking feature 20L on the housing 20 of the fiber optic connector 10. The illustrated embodiment of FIG. 4 shows the major axis MAA of cable 90 generally aligned with the keying portion 20KP at the top and the locking feature 20L at the bottom of the housing 20. Thus, when the one or more cable assemblies 100 are attached to multiport 200, the cables 90 may easily be routed away from the multiport 200 along the connection plane CP. Moreover, the one or more cables 90 may be routed away from the multiport on the connection plane CP in either or both sideways directions since the major axis of the cables 90 are aligned perpendicular in the connection plane CP as best shown in FIG. 7. For instance, some of the cables 90 may be routed upward in the connection plane as shown in FIG. 1 and some of the cables 90 may be routed downward in the connection plane CP as well if desired.

FIG. 2 shows that the ferrule 30 may be a portion of a ferrule assembly 60 and the fiber optic connector 10 may also comprise a spring 38 for biasing the ferrule assembly 60 forward. The ferrule assembly 60 may comprise a ferrule holder 49 and ferrule 30. The ferrule assembly 60 may be inserted into housing 20 for assembly. Specifically, the assembly of the ferrule holder 49 and ferrule 30 are inserted into housing 20 from the front end 23 until they are retained by latch arms 20LA of housing 20. Latch arms 20LA may have ramp portions for aiding portions of ferrule holder 49 to deflect the latch arms 20LA outward as the ferrule holder 49 is inserted into housing 20 and then the latch arms 20LA spring back over ferrule holder 49 for retaining the same within the housing 20. However, other assemblies, orientations or constructions are possible according the concepts of the disclosure.

Fiber optic connector 10 may also comprise other components as desired. By way of example, fiber optic connector 10 may further comprise a cable adapter 59 that is received at a rear end 21 of housing 20 for receiving and securing cable 90. Cable adapter 59 allows different cables to be used with the housing 20. For instance, the cable adapter 59 may have an internal passageway sized and shaped for the desired cable. Other alternatives are possible for securing the cable such as using a crimp band or the like. Fiber optic connector 10 may also comprise a boot 70 that is disposed about a rear part of the connector for inhibiting sharp bending of the cable at the rear of the fiber optic connector 10.

Housings 20 of fiber optic connectors 10 may also have suitable features or structures for sealing connectors 10. The sealing plane should be located at a suitable location along the housing 20 for providing suitable environmental protection as necessary for the desired environment. Illustratively, housing 20 may include one or more grooves 20G for receiving an appropriately sized O-ring 65. Housings 20 may include other features or structures for aiding in sealing. For instance, the housing 20 may have a suitable surface for receiving a portion of a heat shrink 99 or the like for sealing between a portion of the cable 90 and the connector 10 when assembled. Any suitable heat shrink 99 may be used such as a glue-lined heat shrink. It is noted that the heat shrink 99 is depicted in its final form. Moreover, other structures or features are possible for aiding in providing a robustly sealed cable assembly 100.

Cable adapters 59 may comprise an aperture or a cable adapter key as desired. Generally speaking, cable adapter 59 comprises passageway from a cable adapter front end to a cable adapter rear end. Passageway allows the optical fiber 92 of cable 90 to pass therethrough. A shoulder (not numbered) allows cable adapter 59 to have a snug-fit within the passageway 22 of housing 20 and inhibits adhesive from wicking or flowing forward of the shoulder. Any adhesive or epoxy used for securing cable adapter may wick around the recessed surface for creating a sufficient bonding area and any excessive adhesive or epoxy may flow into the aperture of cable adapter 59. Housings 20 may also include one or more apertures 29 for injecting epoxy or adhesive or the adhesive or epoxy may be placed on the cable adapter before insertion into the housing. For instance, housing may include two apertures 29 such as show in FIGS. 5 and 6 so that air may escape as adhesive or epoxy is injected. Additionally, the one or more apertures 29 may be aligned with the apertures of the cable adapter 59 so that the adhesive or epoxy also secures the strength members 94 of cable 90 to the cable adapter 59 that is secured to the housing 20, thereby forming a robust cable/connector attachment and also providing sealing at the rear end. The passageway of cable adapter 59 is sized and shaped for the particular cable 90 that is intended to be secured using the cable adapter along with the appropriate components as appropriate. The rear portion of the cable adapter 59 may comprise one or more ribs suitable for receiving a boot or overmold on the rear portion. The ribs may aid in the retention of the boot or overmold.

This embodiment also comprises a boot or overmold disposed on the rear portion of cable adapter 59 as shown. Further, when assembled a sealing element such a heat shrink 99 is disposed over the boot or overmold as best shown in FIG. 4. The sealing element may also be disposed over a portion of the housing 20 as shown. Placing the sealing element over boot or overmold and a portion of the housing 20 allows for sealing of the cable jacket to the rear of the connector. This may also improve the bending strain-relief for the cable assembly.

Further details of the housing 20 of the fiber optic connector 10 of FIG. 2 are shown in FIGS. 5 and 6. Housing 20 comprises a part of the rear portion RP having a round cross-section RCS and a part of the front portion having a non-round cross-section NRCS. Housing 20 may have other features such as further comprising a transition region TR disposed between the rear portion RP and the front portion FP. The transition region TR may comprise an asymmetric portion AT. The transition region TR or asymmetric portion AT may have any suitable geometry or configuration as desired. In one embodiment, the transition region comprises a threaded portion TP. The threaded portion TP may be used for attaching a dust cap to the connector and/or for converting the footprint of the connector using other suitable components such as converting to an OptiTap® connector.

Housing 20 of fiber optic connector 10 comprises one or more features for alignment during mating and may also comprise other features for securing or locking the connector in a suitable connection port or device. Housing 20 may have a relatively compact form-factor such as having a length of about 40 millimeters (mm) or less and a cross-section dimension of about 15 mm or less such as 12 mm or less, but other suitable dimensions are possible for the housing. Due to the construction of housing 20, the multi-port 200 may have the connection ports 236 arranged in a dense linear array since the connectors do not require a threaded component or bayonet for securing the connector in the port.

As used herein, the transition region TR is disposed between the rear end 21 and the front end 23 where the housing 20 makes a transformational shift in the primitive cross-sectional shapes from a part of a rear portion RP to a part of the front portion FP. As used herein, a primitive cross-section means the outer perimeter of the cross-section without regard for the internal features of the cross-section. Further, portions of the cross-sections may include other features that modify the shape of the primitive cross-sections as desired such as a keying feature, retention feature or a locking feature, while still practicing the concepts of the transition region TR or front/rear portions as disclosed herein. For instance, a front portion FP may have rounded corners or chamfered corners while still being a rectangular cross-section.

In this embodiment of housing 20, the front portion FP of housing 20 has a rectangular cross-section that provides a first orientation feature for the connectors for alignment during mating and inhibit insertion into a non-compliant device or port. The non-round cross-section NRCS has the rectangular cross-section. The rectangular cross-section provides the first orientation feature since the rectangular portion may only be inserted into a complimentary device or port in certain orientations due to its rectangular shape, thereby inhibiting incorrect insertion or insertion into non-compliant devices or ports.

The front portion FP of housing 20 depicted has more than one primitive cross-sectional shape over its length. Specifically, the front portion FP of housing 20 of also comprises another cross-section portion ACSP. By way of explanation, the another cross-sectional portion (ACSP) may comprise a SC footprint. The SC footprint can, in part, be similar to the inner housing of a conventional SC connector. This particular housing footprint is useful for allowing the connectors disclosed to be backwards compatible into existing devices or ports using well-established connector footprints as desired. Other embodiments may have fiber optic connectors configured for LC connector footprints or other known connector footprints as desired.

FIG. 5 is a top perspective view from the front end showing the keying portion 20KP of housing 20, and FIG. 6 is bottom perspective view from the rear end showing the locking feature 20L of housing 20. The locking feature 20L may comprise a ramp 20R for cooperating and securing fiber optic connector 10 in the multiport 200. The locking feature 20L may also comprise other geometry for securing the connector such a ramp 20R with a ledge 20LD such as shown in FIG. 6.

Rear portion RP may include one or more locking features that alter or modify the cross-section. For instance, housing 20 may also include locking feature 20L so that the connector may secured in an adapter, port or other suitable device. For instance, locking feature 20L may comprise features integrated into the housing such as one or more of a groove, a shoulder such as a ramp with a ledge. In these examples, the locking features 20L advantageously are integrated into the housing 20 and do not require extra components and may be used with any of the disclosed concepts. In some embodiments, the locking features 20L are subtractive portions from the primitive geometry of the rear portion RP such as a ramp or notch integrally formed in the round rear portion RP of housing 20. Consequently, having the locking features integrated into the housing 20 (e.g., monolithically formed as part of the housing) may allow denser arrays of connectors in complimentary devices. Moreover, these locking features integrated into the housing 20 are rearward of the sealing location of connectors 10. For example, the integrated locking features of housing 20 are disposed rearward of at least one groove 20G that seats O-ring 65. Locking feature 20L may cooperate with features of a complimentary mating device for securing the mating of the connector 10 with the complimentary mating device.

Housing 20 has features that aid in the proper alignment or orientation of the connector with the port such as markings, keys, keyways, etc. without changing the primitive form-factors of the housings that are disclosed and claimed herein. Additionally, housing may have other features for mating with a complimentary device. Thus, the features of housing 20 are used for aligning the fiber optic connector 10 within the port 236 of multiport 200.

Keying portion 20KP has a predetermined location with respect to an orientation of housing 20 for aligning the form-factor of the housing with a respective port on a mating device such as a multiport. For instance, the housing 20 or keying portion 20KP provides a proper orientation for connection in one orientation, which may be desired for connectors having angled ferrules. In this embodiment, keying portion 20KP ensures correct rotational orientation of the connector 10 during insertion into port 236 and mating with the multiport 200. Additionally, since the fiber optic cable 100 is aligned to the keying feature 20K the major axis MAA of the fiber optic cable 90 is aligned in the respective port 236 of the multiport 200 so that the major axis of the cable 90 is perpendicular to the connection plane CP as depicted in FIG. 7. The connection plane CP is defined as passing thru the centerlines of the linear array of connection ports 236 as shown in the FIGS.

In this embodiment, the keying portion 20KP is configured as a female key or a subtractive portion on housing 20 such as a female keyway or a slice on the side of the connector leaving a D-shape. The keying portion 20KP extends into the transition region as shown. The keying portion 20KP cooperates with a suitable keying portion in a connection port 236 of the multiport 200 such as an additive or male portion for inhibiting non-compliant connectors from being inserted into the connection port. Although, the keying portion 20KP is disposed about 180 degrees from the at least one locking feature 20L, other arrangements are possible where the keying portion 20KP is disposed less than 180 degrees from the at least one locking feature 20L. In other embodiments, keying portion 20KP may be arranged as a subtractive portion that removes a side or slice of the housing 20 for creating a D-shaped cross-section over the length of the keying portion 20KP; instead of the female keyway shown. Moreover, other structures may be used for the keying portion 20KP such as a male key with the complementary structure on the multiport 200.

Figure 8:
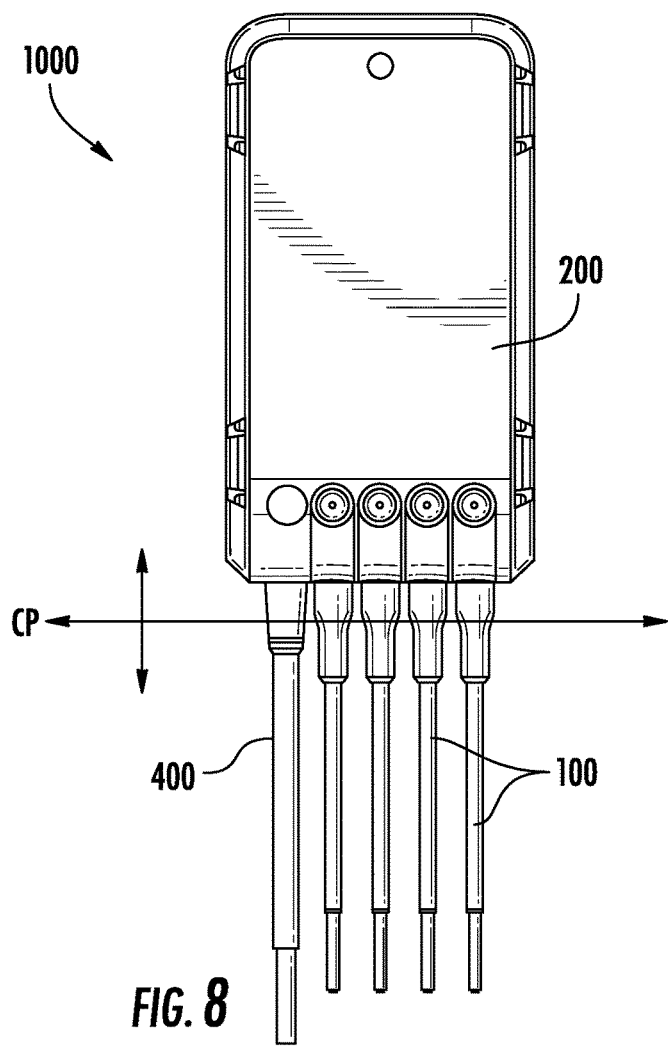
FIG. 8 is a portion of a fiber optic network showing an end view of the multiport with the orientation of the fiber optic cables of the cable assemblies having the connectors secured in the connection port in a vertical orientation relative to a connector plane defined by the centerlines of the connector ports.
Figure 9:
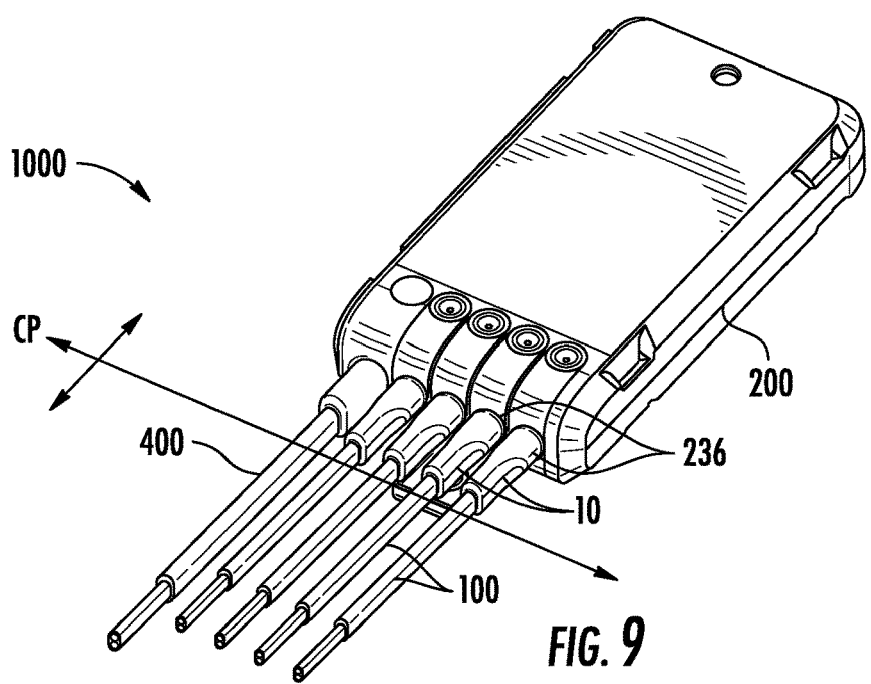
FIG. 9 is a top view of the multiport of FIG. 8 with the arrows showing the bending preference in the connection plane for the fiber optic cables of the cable assemblies attached to the multiport according to the disclosure.

FIGS. 8 and 9 depict portions of fiber optic network 1000 showing top and perspective views of the cable assemblies 100 having the connectors 10 secured in the respective connection ports 236. As represented by the arrows, the fiber optic cable may be moved in the connection plane CP for routing the cables to their desired location for organization and routing according to the concepts disclosed.

Other variations of housings disclosed herein are also possible such as having other shapes for the rear portion RP such as a polygon cross-section PCS, instead of the round cross-section RCS. Polygon cross-sections may have any suitable number of sides such as four, five, six, seven or eight, but other suitable number of sides are also possible. Still other variations are possible with the housing concepts disclosed.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A fiber optic network, comprising:
   at least one cable assembly, the at least one cable assembly comprising:
   a fiber optic connector comprising a housing and a ferrule, the housing comprising a rear end and a front end with a longitudinal passageway extending between the rear end to the front end with a keying portion disposed on an opposite side from a locking feature of the housing; and
   a cable terminated to the fiber optic connector, the cable comprising at least one optical fiber and a cable jacket, wherein the cable jacket comprises a cross-section having a major axis and a minor axis, wherein the cross-section is defined with respect to the minor axis and the major axis is aligned with the keying portion and the locking feature of the fiber optic connector; and
   a multiport comprising:
   a linear array of connection ports disposed on the multiport that define a connection plane aligned on centerlines of the linear array of connection ports, wherein the fiber optic connector is received in the at least one connection port so that the major axis of the cable is perpendicular to the connection plane and the cable is routed away from the multiport along the connection plane.

2. The fiber optic network of claim 1, the housing of the fiber optic connector comprising a part of the rear portion having a round cross-section and a part of the front portion comprising a non-round cross-section with a transition region disposed between the rear portion and the front portion, wherein the transition region comprises an asymmetric portion.

3. The fiber optic network of claim 2, wherein the asymmetric portion is a threaded portion.

4. The fiber optic network of claim 3, wherein the threaded portion is adjacent to a keying portion.

5. A fiber optic network, comprising:
   at least one cable assembly, the at least one cable assembly comprising:
      a fiber optic connector comprising a housing and a ferrule, the housing comprising a rear portion comprising a rear end and a front portion comprising a front end with a longitudinal passageway extending from the rear end to the front end with a keying portion disposed on an opposite side from a locking feature of the housing, wherein a transition region is disposed between the rear portion and the front portion, and the transition region comprises a threaded portion; and
      a cable terminated to the fiber optic connector, the cable comprising at least one optical fiber and a cable jacket, wherein the cable jacket comprises a cross-section having a major axis and a minor axis, wherein the cross-section is defined with respect to the minor axis and the major axis is aligned with the keying portion and the locking feature of the fiber optic connector; and
   a multiport comprising:
      a linear array of connection ports disposed on the multiport that define a connection plane aligned on centerlines of the linear array of connection ports, wherein the fiber optic connector is received in the at least one connection port so that the major axis of the cable is generally perpendicular to the connection plane and the cable is routed away from the multiport along the connection plane.

6. The fiber optic network of claim 5, wherein the threaded portion extends from a non-round cross-section to a round cross-section.

7. The fiber optic network of claim 5, wherein the threaded portion is adjacent to a keying feature.

8. The fiber optic network of claim 5, wherein the keying portion extends into the transition region.

9. A fiber optic network, comprising:
   at least one cable assembly, the at least one cable assembly comprising:
      a fiber optic connector comprising a housing and a ferrule, the housing comprising a rear portion comprising a rear end and a front portion comprising a front end with a longitudinal passageway extending from the rear end to the front end with a keying portion disposed on an opposite side from a locking feature of the housing, wherein the locking feature is integrally formed in the rear portion, and a transition region is disposed between the rear portion of the housing and the front portion, and the transition region comprises a threaded portion; and
      a cable terminated to the fiber optic connector, the cable comprising at least one optical fiber and a cable jacket, wherein the cable jacket comprises a cross-section having a major axis and a minor axis, and the major axis is aligned with the keying portion and the locking feature of the fiber optic connector; and
   a multiport comprising:
      a linear array of connection ports disposed on the multiport that define a connection plane aligned on centerlines of the linear array of connection ports, wherein the fiber optic connector is received in the at least one connection port so that the major axis of the cable is generally perpendicular to the connection plane and the cable is routed away from the multiport along the connection plane.

10. The fiber optic network of claim 9, further comprising a plurality of cable assemblies each comprising a cable terminated to a fiber optic connector that is received in one connection port of the linear array of connection ports, wherein a plurality of cables are routed away from the multiport as a group.

11. The fiber optic network of claim 9, the multiport further comprising a second linear array of connection ports.

12. The fiber optic network of claim 9, the cable further comprising at least one strength member, wherein the at least one strength member is aligned on a major axis of the cross-section of the cable.

13. The fiber optic network of claim 9, the cable further comprising a first strength member and a second strength member, wherein the first strength member and the second strength member are aligned on a major axis of the cross-section of the cable.

14. The fiber optic network of claim 9, the cable further comprising at least one strength member, wherein the at least one strength member is aligned on a major axis of the cross-section of the cable and embedded in the cable jacket.

15. The fiber optic network of claim 9, wherein the keying portion is a female key.

16. The fiber optic network of claim 15, wherein the keying portion extends into the transition region.

17. The fiber optic network of claim 9, wherein the at least one locking feature is disposed about 180 degrees from the keying portion.

18. The fiber optic network of claim 9, wherein the at least one locking feature is a ramp with a ledge.

19. The fiber optic network of claim 9, the fiber optic connector further comprising a ferrule holder, wherein the ferrule is disposed within a portion of the ferrule holder.

20. The fiber optic network of claim 9, wherein the at least one locking feature is a notch, a groove, a shoulder, or a scallop formed in the housing.

21. The fiber optic network of claim 9, wherein the front portion of housing comprises another cross-section portion.

22. The fiber optic network of claim 9, wherein an opening at the front end of the housing is sized for receiving a portion of a ferrule subassembly comprising the ferrule holder and ferrule.

23. The fiber optic network of claim 9, wherein the housing further comprises one or more latch arms for securing the ferrule holder.

24. The fiber optic network of claim 9, the fiber optic connector further comprising a cable adapter.

25. The fiber optic network of claim 9, further comprising a cable adapter, a boot attached to a portion of the cable adapter, and a sealing element disposed over a portion of the boot and a rear portion of the housing.

* * * * *

UNITED STATES PATENT AND TRADEMARK OFFICE
CERTIFICATE OF CORRECTION

PATENT NO. : 11,294,133 B2
APPLICATION NO. : 16/937927
DATED : April 5, 2022
INVENTOR(S) : Thierry Luc Alain Dannoux et al.

It is certified that error appears in the above-identified patent and that said Letters Patent is hereby corrected as shown below:

On the Title Page

Item (71), in Column 1, Applicant, Line 1, delete "Coming" and insert -- Corning --.

Item (56), in Column 2, under "Other Publications", Line 1, delete "Plasti" and insert -- Plastic --.

On the page 2, item (56), in Column 1, under "U.S. Patent Documents", Line 38, delete "Bach et al." and insert -- Danbach et al. --.

On the page 7, item (56), in Column 2, under "Other Publications", Line 15, delete "lopp" and insert -- loop --.

On the page 7, item (56), in Column 2, under "Other Publications", Line 28, delete "Poeceedings" and insert -- Proceedings --.

On the page 7, item (56), in Column 2, under "Other Publications", Line 32, delete "Ughtwave.," and insert -- Lightwave., --.

Signed and Sealed this
Twenty-third Day of August, 2022

Katherine Kelly Vidal
*Director of the United States Patent and Trademark Office*